US012231863B2

(12) United States Patent
Endoh et al.

(10) Patent No.: US 12,231,863 B2
(45) Date of Patent: Feb. 18, 2025

(54) SOUND OUTPUT DEVICE

(71) Applicant: SONY GROUP CORPORATION, Tokyo (JP)

(72) Inventors: Takumi Endoh, Tokyo (JP); Nobukazu Suzuki, Tokyo (JP); Takayoshi Seki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 110 days.

(21) Appl. No.: 18/005,100

(22) PCT Filed: Jun. 14, 2021

(86) PCT No.: PCT/JP2021/022574
§ 371 (c)(1),
(2) Date: Jan. 11, 2023

(87) PCT Pub. No.: WO2022/019004
PCT Pub. Date: Jan. 27, 2022

(65) Prior Publication Data

US 2023/0269541 A1 Aug. 24, 2023

(30) Foreign Application Priority Data

Jul. 20, 2020 (JP) ................................ 2020-123986

(51) Int. Cl.
*H04R 9/06* (2006.01)
*H04R 9/04* (2006.01)

(52) U.S. Cl.
CPC ............... *H04R 9/06* (2013.01); *H04R 9/045* (2013.01)

(58) Field of Classification Search
CPC .......... H04R 9/06; H04R 9/045; H04R 1/028; H04R 7/12; H04R 17/00
See application file for complete search history.

(56) References Cited

U.S. PATENT DOCUMENTS 8,724,833 B1 5/2014 Shain et al.
2009/0175471 A1* 7/2009 Suzuki .................. H04R 15/00 381/190
2020/0288226 A1* 9/2020 Lee ......................... H04R 9/06

FOREIGN PATENT DOCUMENTS

JP 2009-164991 A 7/2009
WO 2016/103930 A1 6/2016
WO 2016/103931 A1 6/2016

OTHER PUBLICATIONS

International Search Report and Written Opinion of PCT Application No. PCT/JP2021/022574, issued on Sep. 7, 2021, 08 pages of ISRWO.

* cited by examiner

*Primary Examiner* — Tuan D Nguyen
(74) *Attorney, Agent, or Firm* — CHIP LAW GROUP

(57) ABSTRACT

A sound output device including: an actuator that outputs a driving force in response to a drive signal; a vibrating body that includes a plurality of receiving parts and is vibrated by a driving force transmitted from the actuator; a transmission plate that is provided with a plurality of pressing parts that press the plurality of receiving parts, respectively; a coil spring that applies a biasing force to the transmission plate to press the plurality of pressing parts against the plurality of receiving parts, respectively; and a base body that receives one end face of the actuator, in which the vibrating body is pressed against another end face of the actuator by a biasing force of the coil spring applied via the plurality of pressing parts and the plurality of receiving parts.

16 Claims, 7 Drawing Sheets

SOUND OUTPUT DEVICE

CROSS REFERENCE TO RELATED APPLICATIONS

This application is a U.S. National Phase of International Patent Application No. PCT/JP2021/022574 filed on Jun. 14, 2021, which claims priority benefit of Japanese Patent Application No. JP 2020-123986 filed in the Japan Patent Office on Jul. 20, 2020. Each of the above-referenced applications is hereby incorporated herein by reference in its entirety.

TECHNICAL FIELD

The present technology relates to the technical field of a sound output device that vibrates a vibrating body by a driving force output from an actuator in response to a drive signal to output sound.

BACKGROUND ART

As a sound output device, for example, there is a device in which a piezoelectric element, a magnetostrictive element, or the like is used as an actuator, a driving force of the actuator output in response to a drive signal is transmitted to a vibrating body, and sound is output by vibrating the vibrating body (see Patent Document 1, for example).

In the sound output device described in Patent Document 1, a drive signal is input to an actuator to expand and contract the actuator, and a vibrating body is vibrated by the expansion and contraction of the actuator to output sound.

In such a sound output device that outputs sound by transmitting a driving force from an actuator to a vibrating body, it is necessary to ensure high transmission efficiency of the driving force from the actuator to the vibrating body.

Therefore, in the sound output device described in Patent Document 1, a pair of vibrating bodies are pressed against both end faces of the actuator by the biasing force of a leaf spring to ensure high transmission efficiency of the driving force generated in the actuator to the vibrating bodies.

CITATION LIST

Patent Document

Patent Document 1: WO 2016/103930 A

SUMMARY OF THE INVENTION

Problem to be Solved by the Invention

Meanwhile, in the sound output device described in Patent Document 1, one end part of the leaf spring is attached to a support arm by screwing, the other end part of the leaf spring is attached to the vibrating body, and the vibrating body is pressed against the actuator by a biasing force of the leaf spring.

Therefore, it is necessary to attach the leaf spring to each part by screwing or the like, and accordingly, attachment work is required and parts such as screws are required. Hence, there is a possibility that the number of steps of assembly work of the sound output device increases and the number of parts increases, which may increase the manufacturing cost.

Furthermore, since the leaf spring is attached to the vibrating body, it is necessary to use a number of leaf springs corresponding to the number of parts pressing the vibrating body against the actuator, and the number of leaf springs increases, which may also increase the manufacturing cost.

Therefore, an object of the sound output device of the present technology is to improve the transmission efficiency of a driving force generated in an actuator to a vibrating body while reducing the manufacturing cost.

Solutions to Problems

First, a sound output device according to the present technology includes: an actuator that outputs a driving force in response to a drive signal; a vibrating body that includes a plurality of receiving parts and is vibrated by a driving force transmitted from the actuator; a transmission plate that is provided with a plurality of pressing parts that press the plurality of receiving parts, respectively; a coil spring that applies a biasing force to the transmission plate to press the plurality of pressing parts against the plurality of receiving parts, respectively; and a base body that receives one end face of the actuator. The vibrating body is pressed against another end face of the actuator by a biasing force of the coil spring applied via the plurality of pressing parts and the plurality of receiving parts.

As a result, the vibrating body is pressed against the actuator by the biasing force of the coil spring transmitted via the plurality of pressing parts of the transmission plate.

Second, in the sound output device described above, it is desirable that a plurality of the actuators be arranged to be spaced apart from each other in a circumferential direction, and the plurality of receiving parts and the plurality of pressing parts be positioned to be spaced apart from each other in the circumferential direction.

As a result, the plurality of pressing parts is pressed against the plurality of receiving parts at positions spaced apart in the circumferential direction.

Third, in the sound output device described above, it is desirable that the plurality of receiving parts and the plurality of pressing parts be positioned at equal intervals.

As a result, the plurality of pressing parts is pressed against the plurality of receiving parts at equal intervals.

Fourth, in the sound output device described above, it is desirable that one coil spring be provided, and the coil spring be positioned inside the plurality of receiving parts.

As a result, one coil spring is positioned inside the plurality of receiving parts spaced apart from each other in the circumferential direction.

Fifth, in the sound output device described above, it is desirable that one end of the coil spring be pressed against a central part of the transmission plate.

As a result, the biasing force of the coil spring is easily equally applied to the plurality of receiving parts.

Sixth, in the sound output device described above, it is desirable that the pressing part be provided on an outer peripheral part of the transmission plate.

As a result, the biasing force of the coil spring applied to the central part of the transmission plate is dispersed in the plurality of receiving parts provided on the outer peripheral part of the transmission plate and applied to the vibrating body.

Seventh, in the sound output device described above, it is desirable that the vibrating body be formed in a cylindrical shape, and one end face of the vibrating body in an axial direction be pressed against the plurality of actuators.

As a result, the vibrating body is formed in a simple shape, and parts in the circumferential direction of the vibrating body are pressed against the plurality of actuators.

Eighth, in the sound output device described above, it is desirable that three actuators be provided at equal intervals.

As a result, since one end face of the cylindrical vibrating body is pressed against the three actuators positioned at equal intervals in the circumferential direction, parts of the vibrating body positioned at equal intervals in the circumferential direction are pressed against the three actuators, and the biasing force of the coil spring is easily uniformly applied to the three actuators via the vibrating body.

Ninth, in the sound output device described above, it is desirable to use a compression coil spring as the coil spring.

As a result, the resonance point appears at a position different from that in a case where a tension coil spring is used as the coil spring.

Tenth, in the sound output device described above, it is desirable that a spring holder having a spring support part inserted into the coil spring be provided, the spring holder be attached to the base body, and the coil spring be compressed between the spring holder and the transmission plate.

As a result, since the base body functions as a member that receives the actuator and also functions as a member to which the spring holder is attached, it is not necessary to separately provide a member that receives the actuator and a member to which the spring holder is attached.

Eleventh, in the sound output device described above, it is desirable that the actuator holder be provided with a positioning part, and the plurality of pressing parts be respectively pressed against the plurality of receiving parts in a state where the transmission plate is positioned by the positioning part.

As a result, the transmission plate is pressed against a part of the vibrator in a state of being positioned by the actuator holder that holds the actuator, and the vibrator is pressed against the actuator.

Twelfth, in the sound output device described above, it is desirable that the spring support part be attached to the actuator holder.

As a result, since the spring support part of the spring holder functions as a part that supports the coil spring and also functions as a part attached to the actuator holder, it is not necessary to separately provide a part that supports the coil spring and a member attached to the actuator holder in the spring holder.

Thirteenth, in the sound output device described above, it is desirable that: a mechanism unit including the actuator holder, the base body, and the spring holder be provided; the spring holder be provided with an attached protrusion to be attached to the base body by screwing; the spring support part be attached to the actuator holder by screwing; the actuator holder be attached to the base body by screwing, and a screwing direction when the attached part is attached to the base body, a screwing direction when the spring support part is attached to the actuator holder, and a screwing direction when the actuator holder is attached to the base body be made the same.

As a result, the spring holder is attached to the base body, the spring holder is attached to the actuator holder, and the actuator holder is attached to the base body by screwing in the same direction.

Fourteenth, in the sound output device described above, it is desirable that the vibrating body be formed in a shape having an internal space, and the transmission plate be disposed in the internal space.

As a result, the transmission plate is not positioned outside the vibrating body.

Fifteenth, in the sound output device described above, it is desirable that the coil spring be arranged in the internal space.

As a result, the coil spring is not positioned outside the vibrating body.

Sixteenth, in the sound output device described above, it is desirable that: the actuator include a drive element that generates a driving force by being expanded and contracted and a reinforcing member in contact with one end face of the drive element; the vibrating body be pressed against the reinforcing member; and the reinforcing member be in point contact or line contact with one end face of the drive element.

As a result, since the reinforcing member is brought into point contact or surface contact with the drive element in a state where the vibrating body is pressed against the reinforcing member by the biasing force of the coil spring, the reinforcing member hardly comes into contact with the outer periphery of one end face of the drive element.

MODE FOR CARRYING OUT THE INVENTION

Hereinafter, a mode for carrying out a sound output device of the present technology will be described with reference to the accompanying drawings.

Hereinafter, a stationary sound output device will be described as an example. Note, however, that the application range of the sound output device of the present technology is not limited to a stationary sound output device, and for example, the sound output device of the present technology can be widely applied to other types of various sound output devices such as a suspended sound output device suspended from a ceiling or the like.

Note that the upper, lower, front, rear, left, and right directions described below are shown for convenience of description, and the present technology is not limited to these directions.

<Configuration of Sound Output Device>

Figure 1:
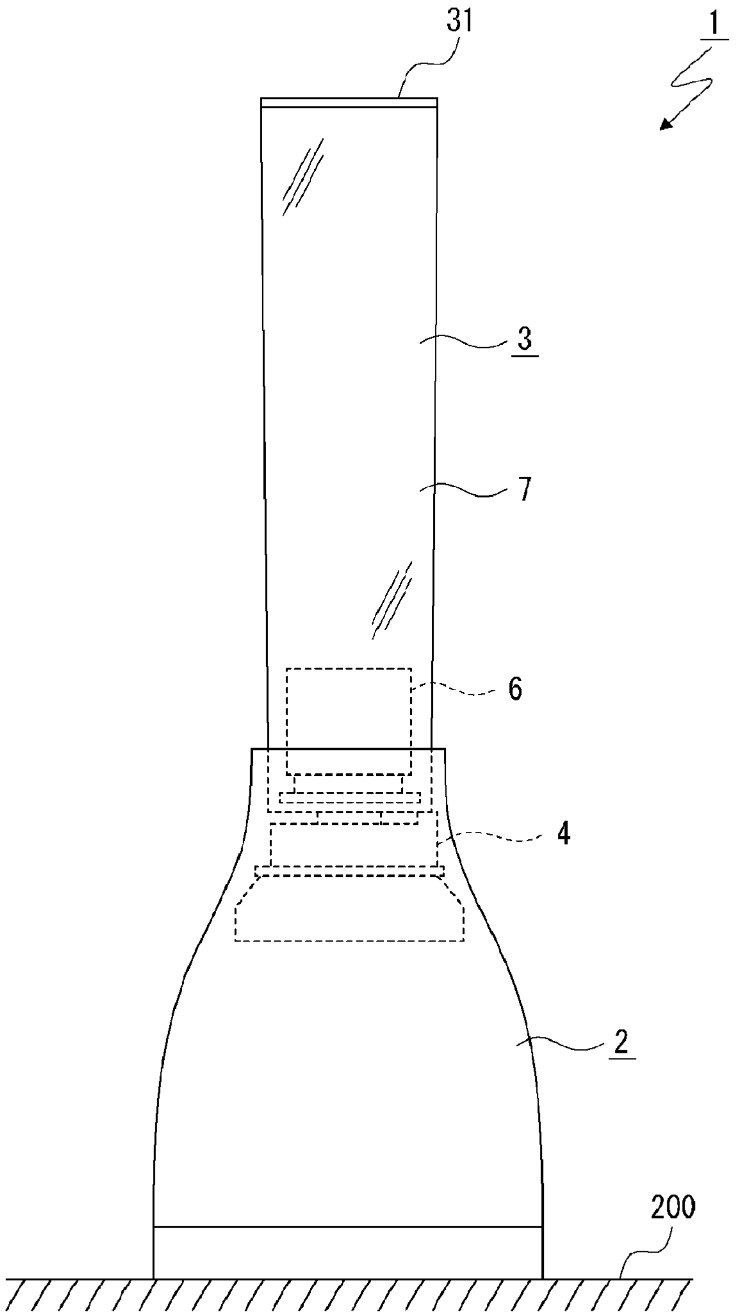
FIG. 1 illustrates an embodiment of a sound output device according to the present technology together with FIGS. 2 to 7, and is a front view of the sound output device.

A sound output device 1 includes a base block 2 installed on an installation surface 200 such as a floor surface and an output block 3 positioned on the upper side of the base block 2, and the output block 3 is attached to an upper end part of the base block 2 (see FIG. 1).

A first sound output unit (not illustrated) and a control circuit unit (not illustrated) are disposed inside the base block 2. The first sound output unit has, for example, a function as a woofer speaker that outputs low-range sound.

Figure 2:
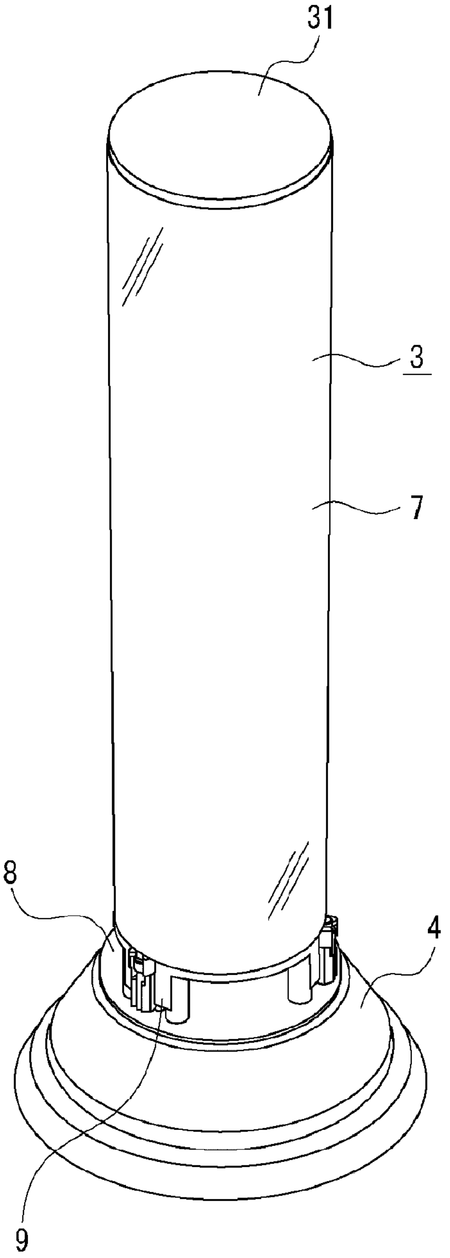
FIG. 2 is a perspective view illustrating a state in which an output block is attached to an attachment base.

The control circuit unit has a control board and has a function of controlling the entire sound output device 1. An attachment base 4 is disposed on an upper end part of the base block 2, and the output block 3 is attached to an upper surface part 5 of the attachment base 4 by screwing or the like (see FIGS. 2 and 3). Screw arrangement holes 5*a*, 5*a*, 5*a* are formed on the upper surface part 5 of the attachment base 4 so as to be spaced apart from each other in the circumferential direction, and screw insertion holes 5*b*, 5*b*, . . . are formed in an outer peripheral part so as to be spaced apart from each other in the circumferential direction (see FIG. 4).

Figure 3:
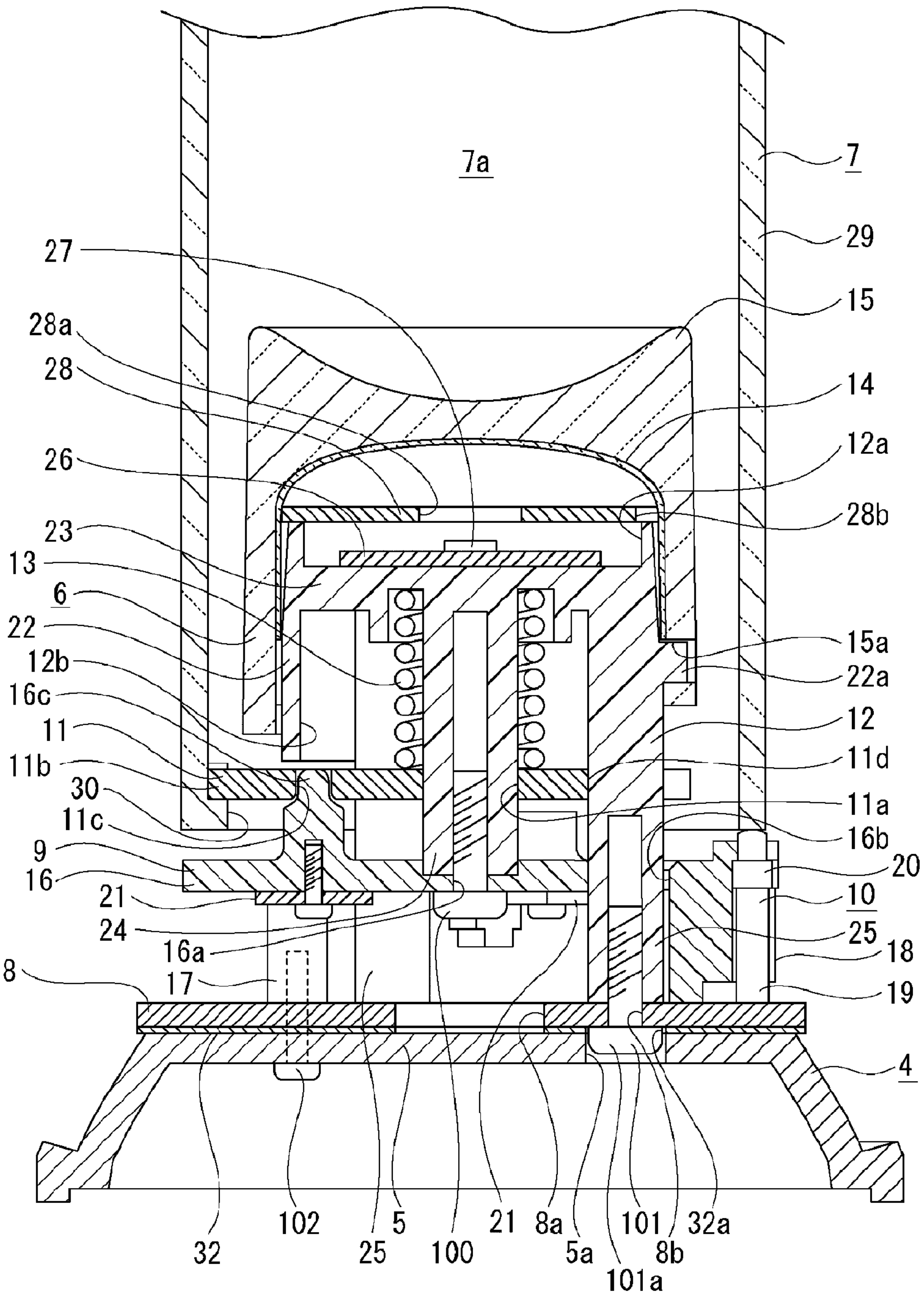
FIG. 3 is a cross-sectional view illustrating a part of an internal structure.

The output block 3 includes a mechanism unit 6 and a vibrating body 7, and a part excluding a part of the mechanism unit 6 is positioned in an internal space 7*a* of the vibrating body 7 (see FIGS. 1 and 3). In the output block 3, a part including the vibrating body 7 is provided as a second sound output unit, and the second sound output unit has a function as, for example, a midbass speaker or a tweeter speaker that outputs middle-range or middle-range to high-range sound.

Figure 4:
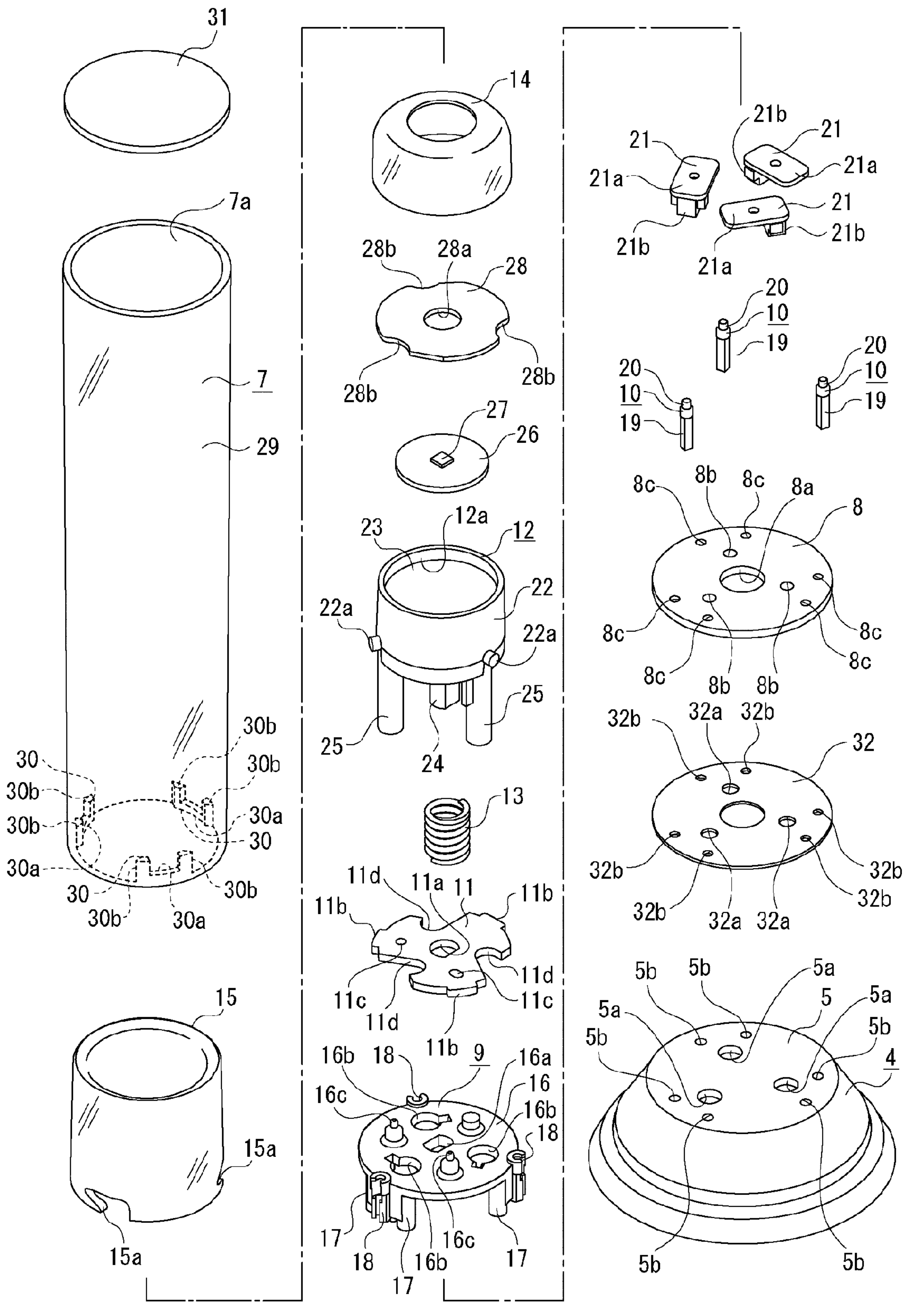
FIG. 4 is an exploded perspective view illustrating parts such as the output block.

The mechanism unit 6 includes a base body 8, an actuator holder 9, actuators 10, 10, 10, a transmission plate 11, a spring holder 12, a coil spring 13, a cap 14, and a transparent cover 15 (see FIGS. 3 and 4).

The base body 8 is formed in a disk shape, and has an insertion hole 8*a* in the central part. In the base body 8, first screw insertion holes 8*b*, 8*b*, 8*b* are formed to be spaced apart from each other in the circumferential direction around the insertion hole 8*a*, and second screw insertion holes 8*c*, 8*c*, . . . are formed to be spaced apart from each other in the circumferential direction in an outer peripheral part.

The actuator holder 9 includes a disk-shaped base surface part 16, coupling leg parts 17, 17, . . . protruding downward from an outer peripheral part of the base surface part 16, and actuator holding parts 18, 18, 18 positioned in an outer peripheral part.

An insertion hole 16*a* is formed in the central part of the base surface part 16, and protrusion insertion holes 16*b*, 16*b*, 16*b* are formed to be spaced apart from each other in the circumferential direction around the insertion hole 16*a*. The base surface part 16 is provided with positioning parts 16*c*, 16*c* protruding upward at positions between the protrusion insertion holes 16*b*, 16*b*, 16*b*.

The coupling leg parts 17 are provided to be spaced apart from each other in the circumferential direction, and for example, two coupling leg parts 17 are positioned on both sides of the actuator holding part 18, and a total of six coupling leg parts 17 are provided. Therefore, the actuator holding part 18 is provided between the two coupling leg parts 17, 17 while being continuous with the coupling leg parts 17, 17. The actuator holding part 18 is at least formed in a vertically penetrating shape.

Figure 5:
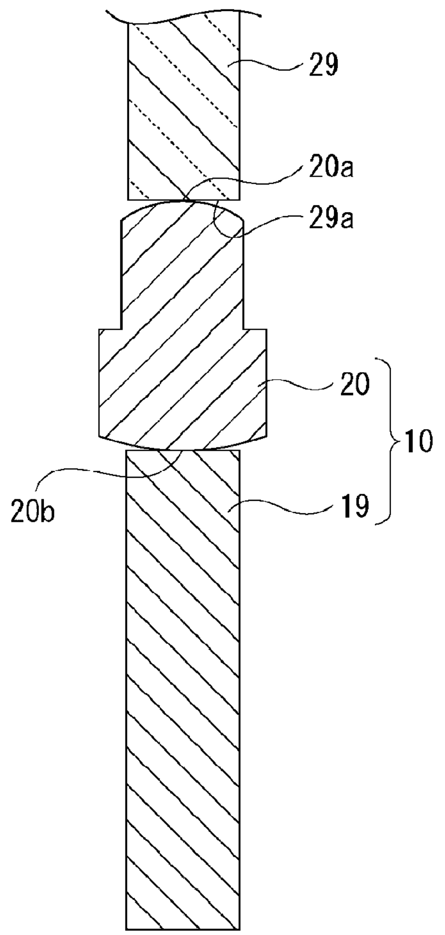
FIG. 5 is an enlarged cross-sectional view illustrating a state in which a lower end surface of a vibrating body is pressed against an actuator.

The actuator 10 includes, for example, a drive element 19 such as a piezoelectric element including ceramic or the like, and a reinforcing member 20 including a metal material or the like positioned on the upper side of the drive element 19 (see FIG. 5). The drive element 19 is formed in, for example, a prismatic shape whose longitudinal direction is the vertical direction. For example, the reinforcing member 20 is formed in a substantially columnar shape in which the diameter of an upper part is slightly smaller than the diameter of a lower part, and an upper surface is formed as a gently curved surface 20*a* protruding upward while a lower surface is formed as a gently curved surface 20*b* protruding downward. Therefore, the actuator 10 is brought into a state where the curved surface 20*b* of the reinforcing member 20 is in point contact or line contact with an upper end face of the drive element 19.

A drive signal (drive current) is supplied from the control circuit unit to the actuator 10. In the actuator 10, the drive element 19 is expanded and contracted in response to the supplied drive signal to output a driving force.

The actuators 10, 10, 10 are respectively inserted into and held by the actuator holding parts 18, 18, 18 of the actuator holder 9 (see FIG. 3). In a state where the actuator 10 is held by the actuator holding part 18, an upper end part of the reinforcing member 20 protrudes upward from the actuator holding part 18, and a lower end part of the drive element 19 protrudes downward from the actuator holding part 18.

Relay boards 21, 21, 21 are attached by screwing or the like to a lower surface of the base surface part 16 of the actuator holder 9 in a state of being spaced apart from each other in the circumferential direction (see FIGS. 3 and 4). The relay board 21 includes a board part 21*a* and a connector 21*b* connected to a lower surface of the board part 21*a*, the board part 21*a* is connected to the control circuit unit via a connection line (not illustrated), and the connector 21*b* is connected to the actuator 10 via a connection cable (not illustrated). Therefore, a drive signal is supplied from the control circuit unit to the actuator 10 via the relay board 21, and the actuator 10 is expanded and contracted in response to the drive signal to output a driving force.

The transmission plate 11 includes, for example, a metal material in a flat plate shape facing the vertical direction, and has a support insertion hole 11*a* in the central part. Pressing parts 11*b*, 11*b*, 11*b* protruding outward are provided at equal intervals in the circumferential direction in an outer peripheral part of the transmission plate 11. In the transmission plate 11, positioning holes 11*c*, 11*c* and recessed relief notches 11*d*, 11*d*, 11*d* opened outward are formed to be spaced apart from each other in the circumferential direction.

In the transmission plate 11, distances from the center of the support insertion hole 11*a* to the pressing parts 11*b*, 11*b*, 11*b* are the same.

The transmission plate 11 is positioned with respect to the actuator holder 9 by inserting the positioning parts 16*c*, 16*c* into the positioning holes 11*c*, 11*c* from below, respectively.

The spring holder 12 includes a substantially cylindrical peripheral surface part 22, a substantially disk-shaped substrate placement part 23 facing the vertical direction, a spring support part 24 protruding downward from the central part of the substrate placement part 23, and attached protrusions 25, 25, 25 protruding downward from an outer peripheral part of the substrate placement part 23.

Coupling pins 22*a*, 22*a*, 22*a* protruding outward are provided in a lower end part of the peripheral surface part 22 so as to be spaced apart from each other in the circumferential direction.

The outer peripheral part of the substrate placement part 23 is continuous with an inner peripheral part of a part of the peripheral surface part 22 near the upper end. Therefore, in the spring holder 12, internal spaces are formed above and below the substrate placement part 23, an upper internal space is formed as a substrate placement space 12*a*, and a lower internal space is formed as the spring placement space 12*b*.

A lower end part of the spring support part 24 is positioned below the peripheral surface part 22, and the length of the spring support part 24 in the axial direction is shorter than that of the attached protrusion 25.

A light source substrate 26 is disposed in the substrate placement space 12*a* of the spring holder 12. In the light source substrate 26, for example, a light source 27 such as a light emitting diode is mounted in the central part. Furthermore, a cover plate 28 is attached to an upper surface of the peripheral surface part 22 of the spring holder 12. In the cover plate 28, a light transmission hole 28*a* is formed in the central part, and light transmission notches 28*b*, 28*b*, 28*b* are formed on an outer peripheral part so as to be spaced apart from each other in the circumferential direction. Therefore, light emitted from the light source 27 is transmitted through the light transmission hole 28*a* and the light transmission notches 28*b*, 28*b*, 28*b* to the outside.

The coil spring 13 is, for example, a compression coil spring, is supported by the spring support part 24 by inserting the spring support part 24 of the spring holder 12, and is disposed in the spring placement space 12*b* of the spring holder 12.

The cap 14 includes, for example, a colored resin material, and is attached to the spring holder 12 from above while covering the light source substrate 26 and the cover plate 28.

The transparent cover 15 includes a resin material and is formed in a shape opened downward, for example. In the transparent cover 15, coupling grooves 15*a*, 15*a*, 15*a* are formed in a lower end part so as to be spaced apart from each other in the circumferential direction. The spring holder 12 is attached to the transparent cover 15 by inserting and engaging the coupling pins 22*a*, 22*a*, 22*a* into the coupling grooves 15*a*, 15*a*, 15*a*, respectively.

In a state where the spring holder 12 is attached to the transparent cover 15, the transparent cover 15 covers the entire cap 14 from above and the outer peripheral side. Therefore, the light emitted from the light source 27 and transmitted through the light transmission hole 28*a* and the light transmission notches 28*b*, 28*b*, 28*b* is transmitted through the transparent cover 15 to the outside.

Figure 6:
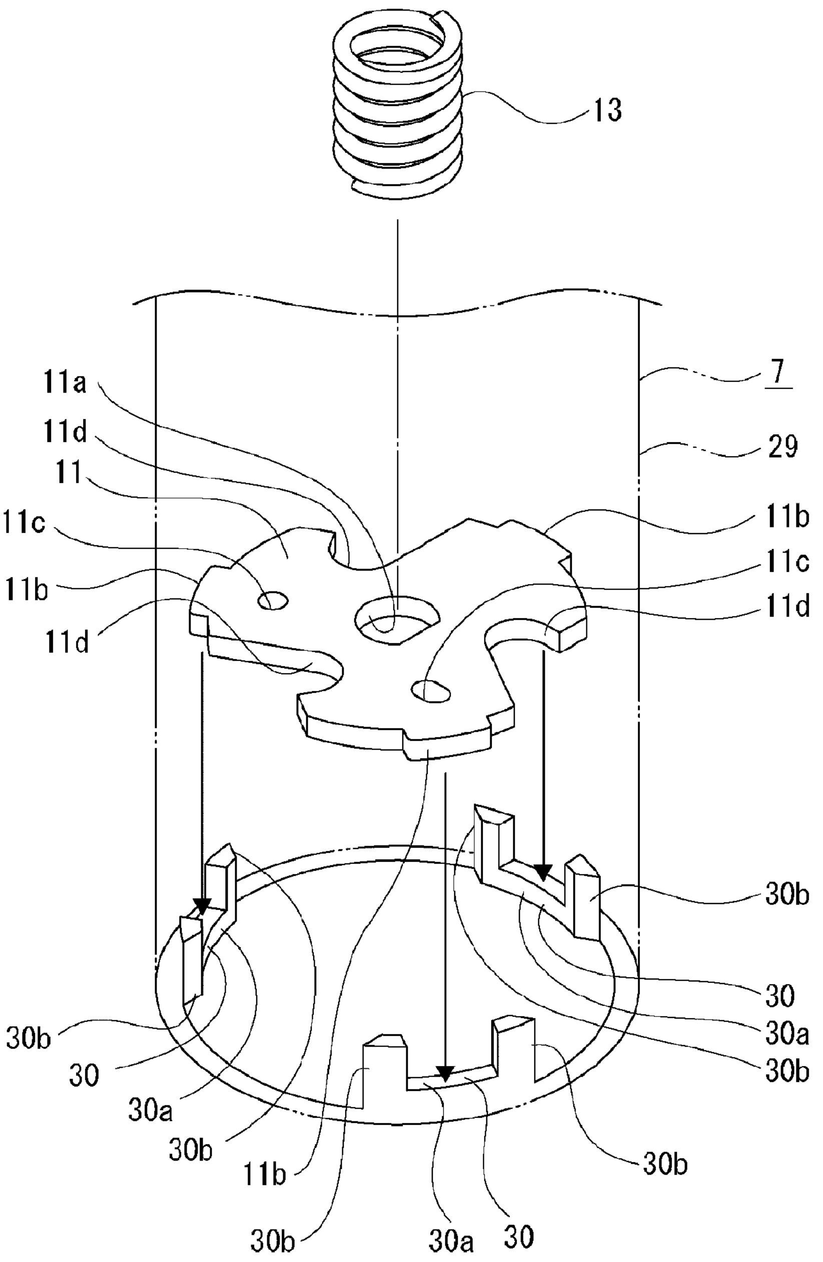
FIG. 6 is an exploded perspective view illustrating a structure in which a transmission plate is pressed against the vibrating body.

The vibrating body 7 includes, for example, a transparent or translucent resin material formed by injection molding using a molten resin, and includes a cylindrical part 29 formed in a cylindrical shape and receiving parts 30, 30, 30 protruding in directions approaching each other from an inner peripheral surface at a lower end part of the cylindrical part 29 (see FIGS. 4 and 6).

The receiving parts 30, 30, 30 are positioned at equal intervals in the circumferential direction. The receiving part 30 includes a base part 30*a* extending in the circumferential direction of the vibrating body 7 and restricting parts 30*b*, 30*b* protruding upward from both end parts of the base part 30*a* in the circumferential direction, and is formed in a recessed shape opened upward.

A top cover 31 is attached to an upper surface of the vibrating body 7 by adhesion or the like. The top cover 31 is vibrated together with the vibrating body 7 by the driving force transmitted from the actuators 10, 10, 10, and has a function of outputting sound together with the vibrating body 7.

<Attachment of Spring Holder and Other Components>

The spring holder 12 is attached to the actuator holder 9 by a screw member 100. In a state where the spring support part 24 is inserted through the support insertion hole 11*a* of the transmission plate 11, the screw member 100 inserted through the insertion hole 8*a* of the base body 8 and inserted through the insertion hole 16*a* of the actuator holder 9 from below is screwed into the spring support part 24, whereby the spring holder 12 is attached to the actuator holder 9 (see FIG. 7).

Furthermore, the spring holder 12 is also attached to the base body 8 by first attachment screws 101, 101, 101. The spring holder 12 is attached to the base body 8 in a state where the positioning parts 16*c*, 16*c* are respectively inserted into the positioning holes 11*c*, 11*c* as described above to position the transmission plate 11 with respect to the actuator holder 9, the coil spring 13 is supported by the spring support part 24, and the transparent cover 15 is positioned inside the vibrating body 7.

At this time, in the transmission plate 11 positioned with respect to the actuator holder 9, the pressing parts 11*b*, 11*b*, 11*b* are brought into contact with the base parts 30*a*, 30*a*, 30*a* of the receiving parts 30, 30, 30 of the vibrating body 7 from above, respectively, and parts of a lower end surface 29*a* of the cylindrical part 29 in the vibrating body 7 are brought into contact with the curved surfaces 20*a*, 20*a*, 20*a* of the reinforcing members 20, 20, 20 in the actuators 10, 10, 10, respectively.

The spring holder 12 is attached to the base body 8 such that the attached protrusions 25, 25, 25 pass through the relief notches 11*d*, 11*d*, 11*d* of the transmission plate 11, respectively, and are inserted through the protrusion insertion holes 16*b*, 16*b*, 16*b* of the actuator holder 9 from above, while the first attachment screws 101, 101, 101 inserted through the first screw insertion holes 8*b*, 8*b*, 8*b* of the base body 8 from below are screwed into the attached protrusions 25, 25, 25, respectively.

The mechanism unit 6 is attached to the upper surface part 5 of the attachment base 4 from above via a cushion 32 formed in a thin disk shape (see FIGS. 3 and 4). In the cushion 32, screw arrangement holes 32*a*, 32*a*, 32*a* are formed to be spaced apart from each other in the circumferential direction, and screw insertion holes 32*b*, 32*b*, 32*b* are formed to be spaced apart from each other in the circumferential direction in an outer peripheral part.

Figure 7:
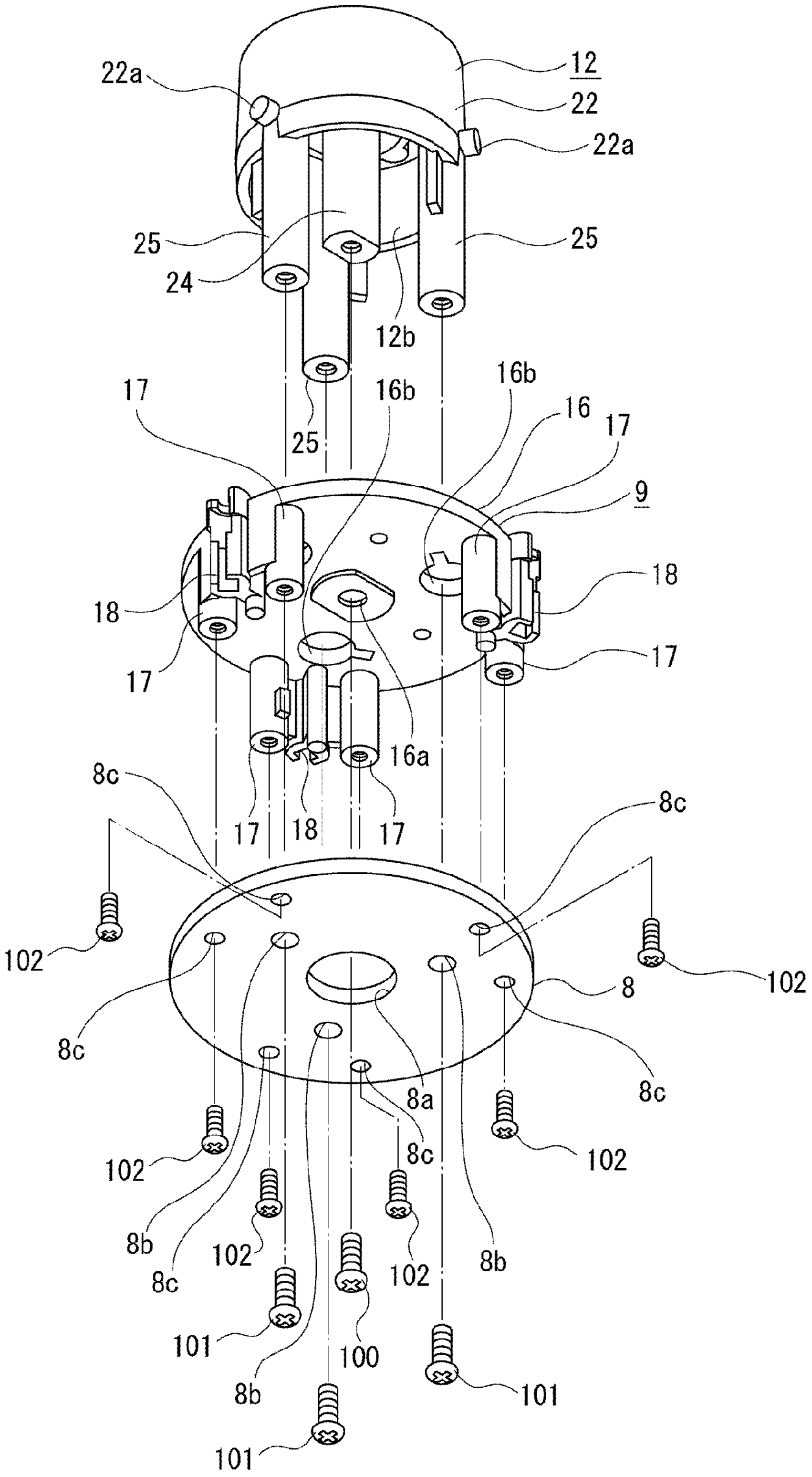
FIG. 7 is an exploded perspective view illustrating a structure in which parts are attached by screwing.

In the mechanism unit 6, the base body 8 is placed on the upper surface part 5 via the cushion 32, the actuator holder 9 is placed on the upper surface part 5 via the cushion 32 and the base body 8, and second attachment screws 102, 102, . . . respectively inserted into the screw insertion holes 5*b*, 5*b*, . . . of the upper surface part 5, the screw insertion holes 32*b*, 32*b*, . . . of the cushion 32, and the second screw insertion holes 8*c*, 8*c*, . . . of the base body 8 from below are screwed into the coupling leg parts 17, 17, . . . , so that the mechanism unit 6 is attached to the upper surface part 5 (see FIGS. 3 and 7). Therefore, the actuator holder 9 is attached to the base body 8, and the base body 8 is attached to the upper surface part 5 in a state of being vertically sandwiched between the actuator holder 9 and the cushion 32.

In this manner, since the base body 8 is attached to the upper surface part 5 of the attachment base 4 via the cushion 32, the mechanism unit 6 is disposed in a stable state without rattling with respect to the upper surface part 5.

As described above, in the mechanism unit 6, the direction of screwing by the screw member 100 when the spring support part 24 of the spring holder 12 is attached to the actuator holder 9, the direction of screwing by the first attachment screw 101 when the attached protrusion 25 of the spring holder 12 is attached to the base body 8, and the direction of screwing by the second attachment screw 102 when the actuator holder 9 is attached to the base body 8 are all the same.

In a state where the spring holder 12 is attached to the base body 8 and the actuator holder 9, the coil spring 13 supported by the spring support part 24 is compressed between the base surface part 16 of the spring holder 12 and the transmission plate 11, the transmission plate 11 is biased downward by the coil spring 13, and the pressing parts 11*b*, 11*b*, 11*b* are respectively pressed against the base parts 30*a*, 30*a*, 30*a* of the vibrating body 7 from above. Note that the upper and lower end surfaces of the coil spring 13 are desirably ground, and by grinding the lower end surface of the coil spring 13, it is possible to curb generation of sound noise due to contact between metals in a contact state with the transmission plate 11 including a metal material, and to stabilize the load applied from the coil spring 13 to the transmission plate 11.

The transmission plate 11 is biased downward by the coil spring 13, and the pressing parts 11*b*, 11*b*, 11*b* are respectively pressed against the base parts 30*a*, 30*a*, 30*a* from above, whereby the vibrating body 7 is biased downward by the coil spring 13 via the pressing parts 11*b*, 11*b*, 11*b* of the transmission plate 11 and the receiving parts 30, 30, 30. Therefore, parts of the lower end surface 29*a* of the cylindrical part 29 are pressed against the curved surfaces 20*a*, 20*a*, 20*a* of the actuators 10, 10, 10, and the actuators 10, 10, 10 are received by the base body 8 from below.

Therefore, the driving force generated in the actuator 10 is transmitted to the vibrating body 7 with high efficiency.

As described above, since the upper surface of the reinforcing member 20 of the actuator 10 is formed as the gently curved surface 20*a* protruding upward, in a state where parts of the lower end surface 29*a* of the vibrating body 7 are pressed against the curved surfaces 20*a*, 20*a*, 20*a* of the actuators 10, 10, 10, the actuators 10, 10, 10 are brought into point contact or line contact with the parts of the lower end surface 29*a* (see FIG. 5).

Therefore, a difference in contact pressure with the vibrating body 7 hardly occurs among the actuators 10, 10, 10, and an even and stable pressing state of each part of the vibrating body 7 with respect to the actuators 10, 10, 10 can be secured.

Note that in a state where the mechanism unit 6 is attached to the upper surface part 5 of the attachment base 4, a head part 101*a* of the first attachment screw 101 screwed into the attached protrusion 25 of the spring holder 12 is positioned in the screw arrangement hole 32*a* of the cushion 32 and the screw arrangement hole 5*a* of the upper surface part 5. Therefore, the head part 101*a* of the first attachment screw 101 does not protrude downward from the upper surface part 5 of attachment base 4, and interference between the head part 101*a* and parts of the base block 2 can be prevented.

<Sound Output in Sound Output Device>

In the sound output device 1 configured as described above, when a drive signal is supplied from the control circuit unit to the actuators 10, 10, 10, the actuators 10, 10, 10 are expanded and contracted in response to the supplied drive signal to output a driving force. The driving force output from the actuators 10, 10, 10 is transmitted to the vibrating body 7, and the vibrating body 7 is vibrated in response to the driving force to output sound. At the same time, the top cover 31 is vibrated together with the vibrating body 7, and a sound based on the vibration of the top cover 31 is also output.

Furthermore, low-range sound is output from the first sound output unit disposed inside the base block 2 at the same time as mid-range or mid-range to high-range sound output from the vibrating body 7 and the like, and it is possible for the user to listen to high-quality sound.

On the other hand, light is emitted from the light source 27 mounted on the light source substrate 26 disposed in the spring holder 12, and the emitted light is transmitted through the light transmission hole 28*a* and the light transmission notches 28*b*, 28*b*, 28*b* of the cover plate 28, transmitted through the transparent cover 15 and the vibrating body 7, and emitted toward the outside. Therefore, the user can listen to high-quality sound in the acoustic space illuminated by the light emitted from the light source 27.

SUMMARY

As described above, in the sound output device 1, the coil spring 13 that applies a biasing force to the transmission plate 11 to press a plurality of pressing parts 11*b* of the transmission plate 11 against a plurality of receiving parts 30 of the vibrating body 7 and the base body 8 that receives one end face (lower surface) of the actuator 10 are provided, and the vibrating body 7 is pressed against the other end face (upper surface) of the actuator 10 by the biasing force of the coil spring 13 applied via the plurality of pressing parts 11*b* and the plurality of receiving parts 30.

Therefore, since the vibrating body 7 is pressed against the actuator 10 by the biasing force of the coil spring 13 transmitted via the plurality of pressing parts 11*b* of the transmission plate 11, the vibrating body 7 is pressed against the actuator 10 without attaching the coil spring 13 to another part by screwing or the like. As a result, the number of steps of assembly work of the sound output device 1 is reduced and the number of parts is also reduced, whereby the manufacturing cost can be reduced. In addition, the transmission efficiency of the driving force generated in the actuator 10 to the vibrating body 7 can be improved.

In particular, since the coil spring 13 is used to bias the vibrating body 7 via the transmission plate 11, a stable appropriate load can be applied to the transmission plate 11 by the coil spring 13, and the driving force generated in the actuator 10 can be transmitted to the vibrating body 7 in a stable state.

Furthermore, since the receiving part 30 of the vibrating body 7 is pressed by the pressing part 11*b* of the transmission plate 11 and the biasing force of the coil spring 13 is applied to the vibrating body 7, a screw hole or the like for attaching the transmission plate 11 to the vibrating body 7 is not necessary, and the vibrating body 7 does not have a hole.

Therefore, when the vibrating body 7 is formed by injection molding, generation of a weld line is curbed, and the strength of the vibrating body 7 can be improved.

Furthermore, a plurality of actuators 10 is arranged spaced apart from each other in the circumferential direction, and a plurality of receiving parts 30 and a plurality of pressing parts 11*b* are positioned to be spaced apart from each other in the circumferential direction.

Therefore, since the plurality of pressing parts 11*b* is pressed against the plurality of receiving parts 30 at positions spaced apart in the circumferential direction, a stable pressing state of the pressing part 11*b* against the receiving part 30 is secured, the vibrating body 7 is pressed against the plurality of actuators 10 in a stable state, and it is possible to further improve the transmission efficiency of the driving force of the plurality of actuators 10 to the vibrating body 7.

Moreover, the plurality of receiving parts 30 and the plurality of pressing parts 11*b* are positioned at equal intervals.

Therefore, since the plurality of pressing parts 11*b* is pressed against the plurality of receiving parts 30 at equal intervals, a more stable pressing state of the pressing part 11*b* against the receiving part 30 is secured, the vibrating body 7 is pressed against the plurality of actuators 10 in a more stable state, and it is possible to further improve the transmission efficiency of the driving force of the plurality of actuators 10 to the vibrating body 7.

Furthermore, one coil spring 13 is provided, and the coil spring 13 is positioned inside the plurality of receiving parts 30.

Therefore, since one coil spring 13 is positioned inside the plurality of receiving parts 30 positioned to be spaced apart from each other in the circumferential direction, the plurality of pressing parts 11*b* is easily uniformly pressed against the plurality of receiving parts 30, and a stable pressing state of parts of the vibrating body 7 with respect to the plurality of actuators 10 can be secured.

In addition, since one end of the coil spring 13 is pressed against the central part of the transmission plate 11, the biasing force of the coil spring 13 is easily uniformly applied to the plurality of receiving parts 30, and a more stable pressing state of parts of the vibrating body 7 with respect to the plurality of actuators 10 can be secured.

Furthermore, a plurality of pressing parts 11*b* is provided on the outer peripheral part of the transmission plate 11.

Therefore, since the biasing force of the coil spring 13 applied to the central part of the transmission plate 11 is dispersed in the plurality of receiving parts 30 provided on the outer peripheral part of the transmission plate 11 and applied to the vibrating body 7, a stable and uniform pressing state of parts of the vibrating body 7 with respect to the plurality of actuators 10 can be secured.

Moreover, the vibrating body 7 is formed in a cylindrical shape, and one end face of the vibrating body 7 in the axial direction is pressed against the plurality of actuators 10.

Therefore, since the vibrating body 7 is formed in a simple shape and parts in the circumferential direction of the vibrating body 7 are pressed against the plurality of actuators 10, a stable pressing state of the parts of the vibrating body 7 against the plurality of actuators 10 can be secured while simplifying the structure.

Furthermore, three actuators 10 are provided at equal intervals.

Therefore, since one end face of the cylindrical vibrating body 7 is pressed against the three actuators 10 positioned at equal intervals in the circumferential direction, parts of the vibrating body 7 positioned at equal intervals in the circumferential direction are pressed against the three actuators 10, respectively, and the biasing force of the coil spring 13 is easily uniformly applied to the three actuators 10 via the vibrating body 7. Thus, a stable pressing state of the vibrating body 7 with respect to the three actuators 10 is secured, and the transmission efficiency of the driving force of the three actuators 10 to the vibrating body 7 can be improved.

In addition, a compression coil spring is used as the coil spring 13.

Therefore, the resonance point appears at a different position as compared with the case where a tension coil spring is used as the coil spring 13, and occurrence of a so-called acoustic noise phenomenon of the spring is suppressed, whereby the quality of the sound can be improved.

Furthermore, the spring holder 12 having the spring support part 24 inserted into the coil spring 13 is provided, the spring holder 12 is attached to the base body 8, and the coil spring 13 is compressed between the spring holder 12 and the transmission plate 11.

Therefore, since the base body 8 functions as a member that receives the actuator 10 and also functions as a member to which the spring holder 12 is attached, it is not necessary to separately provide a member that receives the actuator 10 and a member to which the spring holder 12 is attached, so that the structure of the sound output device 1 can be simplified by reducing the number of parts.

Moreover, the actuator holder 9 that holds the actuator 10 is provided, the positioning part 16*c* is provided in the actuator holder 9, and the pressing part 11*b* is pressed against the receiving part 30 in a state where the transmission plate 11 is positioned by the positioning part 16*c*.

Therefore, since the transmission plate 11 is pressed against a part of the vibrating body 7 in a state of being positioned by the actuator holder 9 holding the actuator 10, and the vibrating body 7 is pressed against the actuator 10, the positional accuracy of the vibrating body 7 with respect to the actuator 10 can be increased, and the transmission efficiency of the driving force of the actuator 10 with respect to the vibrating body 7 can be improved.

Further, the spring support part 24 of the spring holder 12 is attached to the actuator holder 9.

Therefore, since the spring support part 24 of the spring holder 12 functions as a part that supports the coil spring 13 and functions as a part attached to the actuator holder 9, it is not necessary to separately provide a part that supports the coil spring 13 and a member attached to the actuator holder 9 in the spring holder 12, and the structure of the sound output device 1 can be simplified.

In addition, the mechanism unit 6 including the actuator holder 9, the base body 8, and the spring holder 12 is provided, and the screwing direction when the attached part 25 is attached to the base body 8, the screwing direction when the spring support part 24 is attached to the actuator holder 9, and the screwing direction when the actuator holder 9 is attached to the base body 8 are the same.

Therefore, since the spring holder 12 is attached to the base body 8, the spring holder 12 is attached to the actuator holder 9, and the actuator holder 9 is attached to the base body 8 by screwing in the same direction, the mechanism unit 6 can be assembled easily and quickly.

Furthermore, since the attachment of the spring holder 12 to the base body 8, the attachment of the spring holder 12 to the actuator holder 9, and the attachment of the actuator holder 9 to the base body 8 are performed from below the vibrating body 7, it is not necessary to perform the attachment work of these members by inserting a jig such as a driver into the vibrating body 7 from above. Hence, it is possible to prevent the jig from coming into contact with the vibrating body 7 and damaging the vibrating body 7.

Furthermore, the vibrating body 7 is formed to include the internal space 7*a*, and the transmission plate 11 is disposed in the internal space 7*a*.

Therefore, since the transmission plate 11 is not positioned outside the vibrating body 7, it is possible to downsize the sound output device 1 by effectively using the arrangement space.

Furthermore, since the coil spring 13 is disposed in the internal space 7*a*, the coil spring 13 is not positioned outside the vibrating body 7, and the sound output device 1 can be further downsized by effectively using the arrangement space.

Further, the actuator 10 includes the drive element 19 that generates a driving force by being expanded and contracted and the reinforcing member 20 in contact with one end face of the drive element 19, the vibrating body 7 is pressed against the reinforcing member 20, and the reinforcing member 20 is in point contact or line contact with one end face of the drive element 19.

Therefore, since the reinforcing member 20 is brought into point contact or surface contact with the drive element 19 in a state where the vibrating body 7 is pressed against the reinforcing member 20 by the biasing force of the coil spring 13, in particular, the reinforcing member 20 hardly comes into contact with the outer periphery of one end face of the drive element 19 which is often formed in a prismatic shape, and the drive element 19 can be prevented from being cracked or chipped. Note that the reinforcing member 20 may be formed in a plane in which the lower surface faces downward. In this case, the outer shape of the lower surface of the reinforcing member 20 is made larger than the outer shape of the upper surface of the drive element 19, so that the drive element 19 can be prevented from being cracked or chipped.

<Other>

While an example in which one coil spring 13 is provided has been described above, the number of coil springs 13 is not limited to one and may be any number. Note, however, that by using one coil spring 13, it is possible to reduce the manufacturing cost of the sound output device 1 by reducing the number of parts. In addition, by arranging one coil spring 13 in the central part of the transmission plate 11, the biasing force is uniformly distributed to the plurality of pressing parts 11*b*, and it is possible to improve the transmission efficiency of the driving force of the plurality of actuators 10 to the vibrating body 7.

Furthermore, while an example has been described above in which a compression coil spring is used as the coil spring 13 that biases the transmission plate 11, in the sound output device 1, a tension coil spring may be arranged below the transmission plate 11 as the coil spring 13, and the transmission plate 11 may be biased by the tension coil spring.

Furthermore, while an example has been described above in which three actuators 10 are arranged to be spaced apart from each other in the circumferential direction, the number of actuators 10 provided in the sound output device 1 is arbitrary, and the number of pressing parts 11*b* provided in the transmission plate 11 and the number of receiving parts 30 provided in the vibrating body 7 are also arbitrary as long as they are plural.

<Present Technology>

The present technology can also be configured as follows.

(1)

A sound output device including:

- an actuator that outputs a driving force in response to a drive signal;
- a vibrating body that includes a plurality of receiving parts and is vibrated by a driving force transmitted from the actuator;
- a transmission plate that is provided with a plurality of pressing parts that presses the plurality of receiving parts, respectively;
- a coil spring that applies a biasing force to the transmission plate to press the plurality of pressing parts against the plurality of receiving parts, respectively; and
- a base body that receives one end face of the actuator, in which
- the vibrating body is pressed against another end face of the actuator by a biasing force of the coil spring applied via the plurality of pressing parts and the plurality of receiving parts.

(2)

The sound output device according to (1) above, in which

- a plurality of the actuators is arranged to be spaced apart from each other in a circumferential direction, and
- the plurality of receiving parts and the plurality of pressing parts are positioned to be spaced apart from each other in the circumferential direction.

(3)

The sound output device according to (2) above, in which the plurality of receiving parts and the plurality of pressing parts are positioned at equal intervals.

(4)

The sound output device according to (2) or (3) above, in which

- one coil spring is provided, and
- the coil spring is positioned inside the plurality of receiving parts.

(5)

The sound output device according to (4) above, in which one end of the coil spring is pressed against a central part of the transmission plate.

(6)

The sound output device according to (5) above, in which the pressing part is provided in an outer peripheral part of the transmission plate.

(7)

The sound output device according to any one of (2) to (6) above, in which

- the vibrating body is formed in a cylindrical shape, and
- one end face of the vibrating body in an axial direction is pressed against the plurality of actuators.

(8)

The sound output device according to (7) above, in which three actuators are provided at equal intervals.

(9)

The sound output device according to any one of (1) to (8) above, in which

- a compression coil spring is used as the coil spring.

(10)

The sound output device according to (9) above further including a spring holder having a spring support part inserted into the coil spring, in which

- the spring holder is attached to the base body, and
- the coil spring is compressed between the spring holder and the transmission plate.

(11)

The sound output device according to (10) above further including an actuator holder that holds the actuator, in which

- the actuator holder is provided with a positioning part, and
- the plurality of pressing parts is respectively pressed against the plurality of receiving parts in a state where the transmission plate is positioned by the positioning part.

(12)

The sound output device according to (11) above, in which

- the spring support part is attached to the actuator holder.

(13)

The sound output device according to (12) above further including a mechanism unit including the actuator holder, the base body, and the spring holder, in which:

- the spring holder is provided with an attached protrusion to be attached to the base body by screwing;
- the spring support part is attached to the actuator holder by screwing;
- the actuator holder is attached to the base body by screwing; and
- a screwing direction when the attached part is attached to the base body, a screwing direction when the spring support part is attached to the actuator holder, and a screwing direction when the actuator holder is attached to the base body are made the same.

(14)

The sound output device according to any one of (1) to (13) above, in which the vibrating body is formed in a shape having an internal space, and the transmission plate is disposed in the internal space.

(15)

The sound output device according to (14) above, in which the coil spring is disposed in the internal space.

(16)

The sound output device according to any one of (1) to (15) above, in which:

the actuator includes a drive element that generates a driving force by being expanded and contracted and a reinforcing member in contact with one end face of the drive element;

the vibrating body is pressed against the reinforcing member; and the reinforcing member is in point contact or line contact with one end face of the drive element.

REFERENCE SIGNS LIST

1 Sound output device
6 Mechanism unit
7 Vibrating body
7*a* Internal space
8 Base body
9 Actuator holder
10 Actuator
11 Transmission plate
11*b* Pressing part
12 Spring holder
13 Coil spring
16*c* Positioning part
19 Drive element
20 Reinforcing member
24 Spring support part
25 Attached protrusion
30 Receiving part

The invention claimed is:

1. A sound output device, comprising:

an actuator configured to output a driving force based on a drive signal;

a vibrating body that includes a plurality of receiving parts, wherein the actuator is further configured to vibrate the vibrating body based on the driving force;

a transmission plate that includes a plurality of pressing parts, wherein the plurality of pressing parts is configured to press the plurality of receiving parts, respectively;

a coil spring configured to apply a biasing force to the transmission plate, wherein the transmission plate is configured to press the plurality of pressing parts against the plurality of receiving parts, respectively; and a base body configured to receive a first face of the actuator, wherein the coil spring is further configured to press the vibrating body against a second face of the actuator based on the biasing force.

2. The sound output device according to claim 1, wherein each of a plurality of actuators is spaced apart in a circumferential direction, the plurality of actuators comprises the actuator, and each of the plurality of receiving parts and the plurality of pressing parts is spaced apart in the circumferential direction.

3. The sound output device according to claim 2, wherein each of the plurality of receiving parts and the plurality of pressing parts is at equal intervals.

4. The sound output device according to claim 2, wherein the coil spring is inside the plurality of receiving parts.

5. The sound output device according to claim 4, wherein a first end of the coil spring is pressed against a central part of the transmission plate.

6. The sound output device according to claim 5, wherein a pressing part of the plurality of pressing parts is in an outer peripheral part of the transmission plate.

7. The sound output device according to claim 2, wherein the vibrating body is in a cylindrical shape, and a specific face of the vibrating body, in an axial direction, is pressed against the plurality of actuators.

8. The sound output device according to claim 7, wherein the plurality of actuators comprises three actuators, and the three actuators are at equal intervals.

9. The sound output device according to claim 1, wherein the coil spring is a compression coil spring.

10. The sound output device according to claim 9, further comprising:

a spring holder that comprises a spring support part, wherein the spring support part is in the coil spring, the spring holder is attached to the base body, and the coil spring is compressed between the spring holder and the transmission plate.

11. The sound output device according to claim 10, further comprising:

an actuator holder configured to hold the actuator, wherein the actuator holder comprises a positioning part, and the plurality of pressing parts is respectively pressed against the plurality of receiving parts based on the transmission plate is adjacent to the positioning part.

12. The sound output device according to claim 11, wherein the spring support part is attached to the actuator holder.

13. The sound output device according to claim 12, further comprising:

a mechanism unit that includes the actuator holder, the base body, and the spring holder, wherein the spring holder comprises an attached protrusion that is attached to the base body based on a first screwing operation, the spring support part is attached to the actuator holder based on a second screwing operation, the actuator holder is attached to the base body based on a third screwing operation, and a first screwing direction associated with the first screwing operation, a second screwing direction associated with the second screwing operation, and a third screwing direction associated with the third screwing operation are same.

14. The sound output device according to claim 1, wherein the vibrating body further includes an internal space, and the transmission plate is in the internal space.

15. The sound output device according to claim 14, wherein the coil spring is in the internal space.

16. The sound output device according to claim 1, wherein the actuator includes a drive element and a reinforcing member, the driving element is configured to generate the driving force based on an expansion and a contraction of the driving element, and the reinforcing member in contact with a specific face of the drive element, the vibrating body is pressed against the reinforcing member, and the reinforcing member is in one of a point contact or a line contact with the specific face of the drive element.

* * * * *